US012786642B2

(12) United States Patent
Burwinkel et al.

(10) Patent No.: US 12,786,642 B2
(45) Date of Patent: Nov. 3, 2026

(54) TELECOIL TICK-ARTIFACT MITIGATION FOR BINAURAL HEARING INSTRUMENTS

(71) Applicant: Starkey Laboratories, Inc., Eden Prairie, MN (US)

(72) Inventors: Justin R. Burwinkel, Eden Prairie, MN (US); Thomas O. Monsen, Carver, MN (US); Mohammad Reza Movahedi, Minnetonka, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 185 days.

(21) Appl. No.: 18/915,962

(22) Filed: Oct. 15, 2024

(65) Prior Publication Data

US 2025/0126419 A1 Apr. 17, 2025

Related U.S. Application Data

(60) Provisional application No. 63/590,634, filed on Oct. 16, 2023.

(51) Int. Cl.
*H04R 25/00* (2006.01)

(52) U.S. Cl.
CPC ........... *H04R 25/554* (2013.01); *H04R 25/43* (2013.01); *H04R 25/552* (2013.01); *H04R 2225/49* (2013.01); *H04R 2225/61* (2013.01)

(58) Field of Classification Search
CPC .... H04R 25/554; H04R 25/43; H04R 25/552; H04R 2225/49; H04R 2225/61
USPC .................................................. 381/23.1, 312
See application file for complete search history.

(56) References Cited

U.S. PATENT DOCUMENTS

| | | | | |
|---|---|---|---|---|
| 9,763,017 B2 * | 9/2017 | Roeck | .................... | H04W 76/14 |
| 10,425,745 B1 * | 9/2019 | Merks | .................. | H04R 25/554 |
| 11,825,270 B2 * | 11/2023 | Pedersen | .............. | H04R 25/554 |
| 12,079,532 B2 * | 9/2024 | Behzadi | ................. | G06F 13/128 |
| 2003/0045283 A1 * | 3/2003 | Hagedoorn | .......... | H04R 25/558 455/557 |

(Continued)

OTHER PUBLICATIONS

Burwinkel, J R, et al., "A Sound Investment: Hearing loops and induction coils in Genesis AI yield dramatic improvements in public spaces", Starkey, (Jul. 1, 2023), 10 pgs.

*Primary Examiner* — William J Deane, Jr.
(74) *Attorney, Agent, or Firm* — Schwegman Lundberg & Woessner, P.A.

(57) ABSTRACT

Disclosed herein, among other things, are systems and methods for mitigating interference within a telecoil signal for hearing devices. A system includes a first hearing device and a second hearing device. The first hearing device includes a magnetic sensor configured to sense an inductive signal, a first wireless radio configured for wireless communication, and a first near-field radio configured for near-field communication. The second hearing device includes a second wireless radio configured for wireless communication and a second near-field radio configured for near-field communication. The first hearing device is configured to selectively deactivate the first wireless radio when using the magnetic sensor to reduce interference in the sensed inductive signal, and further configured to transmit the sensed inductive signal to the second hearing device using the first near-field radio. The second hearing device is configured to receive the sensed inductive signal using the second near-field radio.

22 Claims, 4 Drawing Sheets

(56) References Cited

U.S. PATENT DOCUMENTS

| | | | | |
|---|---|---|---|---|
| 2004/0052391 | A1* | 3/2004 | Bren | H04R 25/552 381/331 |
| 2005/0069161 | A1* | 3/2005 | Kaltenbach | H04R 25/554 379/443 |
| 2011/0150249 | A1* | 6/2011 | Klemmensen | H04R 25/554 381/312 |
| 2011/0319018 | A1* | 12/2011 | Kroman | H04R 25/554 455/41.1 |
| 2014/0140554 | A1* | 5/2014 | Ruaro | H04R 25/554 381/315 |
| 2016/0227332 | A1* | 8/2016 | Pedersen | H04R 25/558 |
| 2016/0286323 | A1* | 9/2016 | Buehl | H04R 25/305 |
| 2019/0174235 | A1* | 6/2019 | Ma | H04R 25/552 |
| 2019/0387328 | A1* | 12/2019 | Khing | H04R 25/407 |
| 2020/0107140 | A1* | 4/2020 | Solum | H04R 25/554 |
| 2021/0297793 | A1* | 9/2021 | Løngaa | H04B 5/26 |

* cited by examiner

TELECOIL TICK-ARTIFACT MITIGATION FOR BINAURAL HEARING INSTRUMENTS

CLAIM OF PRIORITY AND INCORPORATION BY REFERENCE

The present application claims the benefit under 35 U.S.C. § 119 (e) of U.S. Provisional Patent Application 63/590,634, filed Oct. 16, 2023, the disclosure of which is hereby incorporated by reference herein in its entirety.

TECHNICAL FIELD

This document relates generally to audio device systems and more particularly to systems and methods for preventing or mitigating interference or artifacts for a telecoil signal for hearing devices.

BACKGROUND

Audio devices can be used to provide audible output to a user based on received wireless signals. Examples of audio devices include speakers and ear-wearable devices, also referred to herein as hearing devices. Example of hearing devices include hearing assistance devices or hearing instruments, including both prescriptive devices and non-prescriptive devices. Specific examples of hearing devices include, but are not limited to, hearing aids, headphones, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Telecoils or other magnetic sensors may be used to access wireless, non-acoustic audio transmissions from, e.g., inductive hearing loops, neck loops, etc., which ultimately provide hearing aid users access to speech with a greater signal to noise ratio (SNR). Telecoils are sensitive to magnetic fields and may sense signals that are potentially detrimental to sound quality, including internal interference caused by other hearing aid components like Bluetooth radios, power management integrated circuits (PMIC), receivers, and associated wiring. The presence of these interfering magnetic fields and signals makes designing the internal layout of hearing aids (including the placement and orientation of telecoils in relation to other components) a cumbersome process, particularly for custom hearing aid styles where the internal components have additional degrees of freedom while being constructed.

Achieving the optimal positioning and orientation of telecoils in relation to other components also becomes an increasingly challenging endeavor as many consumers have a desire for continually smaller and more stylish industrial designs, which further constrains how telecoils and other internal components are positioned and oriented relative to each other. Furthermore, the theoretical ideal telecoil placement is relative to the orientation of the inductive loop transmitting the desired audio signal. Currently, some hearing aids are constructed with the telecoil deliberately angled away from sensing magnetic fields produced by other internal components. This design strategy aims to prevent the telecoil from inadvertently inducing unwanted artifacts that could be perceived by the user in the audio produced by the hearing assistance device. However, this approach can also result in the telecoil being angled away from its theoretical ideal orientation which can unfavorably diminish sensitivity to a desired magnetic field, thereby compromising the user's audio experience by reducing the SNR.

Thus, there is a need in the art for improved systems and methods for preventing or mitigating interference or artifacts for a telecoil signal for ear-wearable devices.

SUMMARY

Disclosed herein, among other things, are systems and methods for mitigating interference from a telecoil signal for ear-wearable hearing devices. A method includes using a first hearing device of a binaural pair of hearing devices to selectively deactivate a first wireless radio of the first hearing device before using a magnetic sensor of the first hearing device to sense an inductive signal, the deactivation configured to reduce interference in the sensed inductive signal, sense the inductive signal using the magnetic sensor, and transmit the sensed inductive signal to a second hearing device of the binaural pair of hearing devices using a first near-field radio of the first hearing device. The method also includes using the second hearing device of the binaural pair of hearing devices to receive the sensed inductive signal from the first hearing device using a second near-field radio of the second hearing device.

Various aspects include a system configured to mitigate interference for a magnetic sensor signal. The system includes a first hearing device and a second hearing device. The first hearing device includes a magnetic sensor configured to sense an inductive signal, a first wireless radio configured for wireless communication, and a first near-field radio configured for near-field communication. The second hearing device includes a second wireless radio configured for wireless communication and a second near-field radio configured for near-field communication. The first hearing device is configured to selectively deactivate the first wireless radio when using the magnetic sensor to reduce interference in the inductive signal, and further configured to transmit the sensed inductive signal to the second hearing device using the first near-field radio. The second hearing device is configured to receive the sensed inductive signal from the first hearing device using the second near-field radio.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
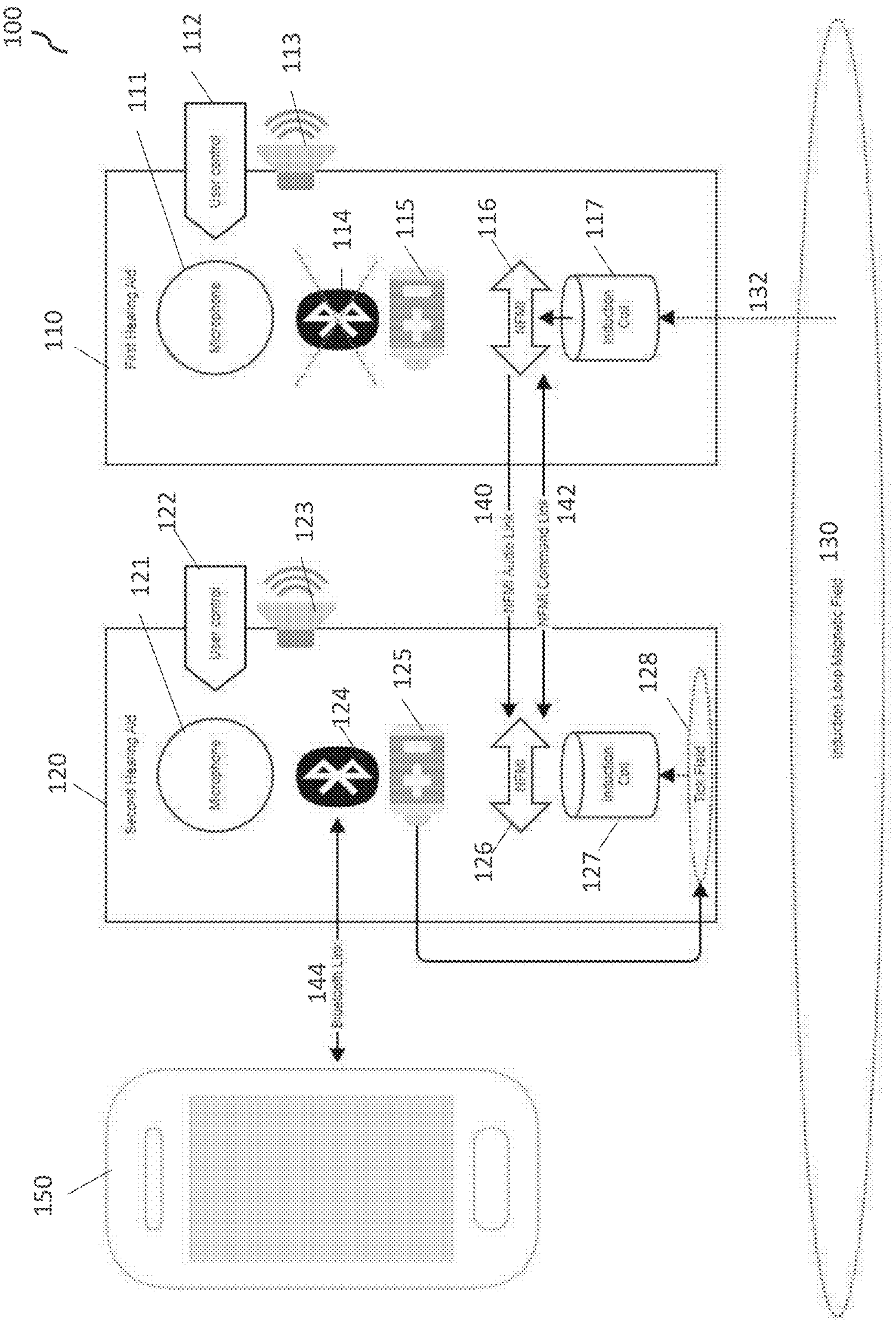
FIG. 1 illustrates a system for mitigating interference for a telecoil signal for hearing devices, according to various examples of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment, including combinations of such embodiments. The following detailed description is demonstrative and not to be taken in a limiting sense. The scope of the present subject matter is defined by the appended claims, along with the full scope of legal equivalents to which such claims are entitled.

The present detailed description will discuss audio devices such as hearing devices and speakers. The description refers to hearing devices or hearing instruments generally, which include earbuds, headsets, headphones, and hearing assistance devices using the example of hearing aids. Other hearing devices include, but are not limited to, those in this document. It is understood that their use in the description is intended to demonstrate the present subject matter, but not in a limited or exclusive or exhaustive sense.

Telecoils or other magnetic sensors may be used to access wireless, non-acoustic audio transmissions which ultimately provides hearing aid users access to desired audio, such as speech, with a greater SNR than what, in many situations, could be achieved using only the acoustic microphone of the hearing device. Telecoils are sensitive to magnetic fields and may also sense undesired signals that are potentially detrimental to sound quality, including internal interference caused by other hearing aid components like Bluetooth radios, PMIC, batteries, receivers and associated wiring. The presence of these interfering signals makes designing the internal layout of hearing aids (including the placement and orientation of telecoils in relation to other components) a cumbersome process, particularly for custom hearing aid styles where the internal components have additional degrees of freedom while being constructed.

Telecoil artifacts are caused by components on the hearing device circuit, such as a Bluetooth radio, which draw short bursts of current. Most hearing device circuits cannot feasibly route the power and ground current paths for every component to be exactly overlaid at all points, especially around the battery contacts. Therefore, the typical hearing device circuit will have current loops where current through components takes a somewhat circular rather than linear path as it comes from and returns to the battery. These current loops cause a magnetic field to be created. When the current rapidly changes, it causes a rapidly changing magnetic field. This changing magnetic field is what the telecoil picks up as the "tick" or ticking artifact.

Telecoils are known to have directional sensitivity and are generally positioned in either a horizontal-to-the-earth's surface position to be optimally sensitive to magnetic fields produced by telephone receivers placed near the wearer's ear and/or hearing device, or in a vertical-to-the-earth's surface position to be optimally sensitive to magnetic fields produced by assistive hearing accessibility systems like induction hearing loops and neck loops. With progressively more hearing aids connecting to mobile phones using Bluetooth, there has been greater emphasis for selecting vertical orientations for the telecoil that yield optimal performance with assistive hearing accessibility systems, such as hearing loops and neck loops. After a systematic investigation of actual hearing loop systems being used to provide public hearing accessibility, Burwinkel et al. ("A Sound Investment: Hearing loops and induction coils in Genesis AI yield dramatic improvements in public spaces," July 2023) concluded that telecoils and hearing loops can provide hearing device users with 5 to 30 dB of SNR improvement. Despite this apparent benefit, some hearing devices are built without telecoils due to design complexities and a prevailing market desire for smaller and more stylish industrial designs. Case size, geometry, component characteristics, circuit paths, and other industrial design constraints can make it difficult or impossible to find a tick-free telecoil location that allows the telecoil position and orientation to be optimized for the desired functional emphasis.

Ticking rates may vary depending on the Bluetooth radio activity. During advertising, "triplet" packets are transmitted in very close temporal succession. Connection packets typically tick once every 20-40 msec, as directed by master device (usually a smartphone paired to the hearing aids). An unpublished study conducted by Burwinkel, Monsen, Movahedi, and Moore (2023) found that telecoil ticking was perceived by both hearing impaired users (using prescription-fit hearing aids) and normal-hearing subjects (using generic amplification levels) when the ticking was as little as 2 dB above the noise floor of the telecoil listening program. The study investigated the effects of interstimulus interval (20 ms, 45 ms, and 200 ms) on the detection levels of both groups, and a positive relationship (albeit statistically non-significant with our sample) between greater inter-stimulus intervals and detection thresholds was observed. The study also evaluated the effects of different levels of expansion and foreground stimulus (silence, music, and speech) on background telecoil ticking tolerance and overall sound quality. Among the hearing aid users listening to a 'silent' hearing loop signal, Expansion 'Off' yielded significantly lower (worse) telecoil ticking tolerance levels than with Expansion Level 3 ($p=0.032$). However, aggressive expansion settings caused increased perception of artifacts negatively impacting sound quality when listening to speech stimuli. Therefore it is advantageous for maintaining highly-rated sound quality to manage telecoil ticking using the present system rather than through means of aggressive expansion.

The present subject matter provides for a hearing device to mitigate or eliminate ticking artifacts from a telecoil signal when the source of the ticking is an internal hearing device operation, such as Bluetooth radio activity. In various examples, the present subject matter provides for a binaural set of hearing devices to completely remove the telecoil ticking artifact. In one example, telecoil ticking is caused when the telecoil cannot be positioned far enough away from the Bluetooth radio and/or the battery, which may radiate a fluctuating magnetic field that corresponds to spikes in power draw caused from Bluetooth radio activity. For various reasons, the internal layout of hearing device designs sometimes cannot conform to optimal telecoil positioning in such a way that system requirements for eliminating telecoil ticking can be achieved, despite the desire to provide telecoil functionality.

The present subject matter provides a method of selectively deactivating a wireless radio (such as a Bluetooth radio) of a first "telecoil transmitting" hearing device when the hearing device is set to a telecoil listening program, and then sending the first telecoil audio signal to the second hearing device via a near-field communication (such as an near-field magnetic induction (NFMI) link), where the second "telecoil receiving" hearing device is able to maintain normal Bluetooth functionality, in various examples. In various examples, the second hearing device is able to accept user commands from Bluetooth peripheral devices and subsequently share those commands with the first hearing device via NFMI communication. This configuration is advantageous because the near-field radio is not as prone to causing artifacts in the first magnetic sensor's sensed inductive signal. This audio routing scheme therefore allows both hearing devices to play tick-free telecoil audio binaurally while also maintaining the ability of the user to control the devices with their smartphone and remote control accessories, in various examples. In various examples, this audio routing scheme also advantageously allows for the telecoil or magnetic sensor to be oriented more ideally for its intended functional emphasis.

As shown in FIG. 1, in one example, a system 100 of the present subject matter includes a first hearing device (or hearing instrument) 110 and a second hearing device 120. In this example, the first hearing device 110 includes a processor (not shown), a battery 115, a microphone 111, a speaker or receiver 113, a wireless (electromagnetic) radio 114 such as a Bluetooth radio with ability to selectively deactivate when in induction coil listening program, a near-field radio 116 such as an NFMI radio, a magnetic sensor such as a first induction coil 117 or telecoil, and an optional user control 112 such as switches or buttons or a combination thereof. The second hearing device 120 may include a processor (not shown), a battery 125, a microphone 121, a wireless radio 124 such as a Bluetooth radio, a near-field radio 126 such as an NFMI radio, an optional magnetic sensor such as a second induction coil 127 or telecoil, and an optional user control 122 such as switches or buttons or a combination thereof. In some examples, a user may select to switch into the tick mitigation mode by using the optional user control 122 of the first or second hearing device. In still further examples, the user may select to switch into the tick mitigation mode by using a gesture control (not shown) of one or more of the first or second hearing device.

In various examples, the first and second hearing devices or instruments are capable of communicating with one or more peripheral devices 150 using an electromagnetic radio (e.g., Bluetooth), where the first hearing device 110 deactivates or reduces activity of the first electromagnetic radio 114 in response to the first hearing device 110 entering an induction coil listening mode. In various examples, the induction coil listening mode includes the first induction coil 117 sensing an induction loop magnetic field 130 and the processor of the first hearing device using the receiver 113 to play at least a portion of the audio signal received from the first induction coil 117. In some examples, the processor of the first hearing device 110 is configured to send the sensed induction coil audio signal 132 to the second hearing device 120 using an NFMI audio link 140, and the processor of the second hearing device 120 plays at least a portion of the audio received from the NFMI audio link 140 using the second receiver 123. Because the second hearing device 120 continues using the wireless or electromagnetic radio 124, the battery 125 of the second hearing device may cause a tick field 128. Therefore, the present subject matter provides for the second device 120 to receive the sensed induction coil audio signal 132 (which is relatively tick-free due to the first device deactivating the wireless radio 114) via the NFMI audio link 140. The second hearing device 120 may deactivate or ignore the second induction coil 127 during this time to avoid the tick field 128, in various examples. In some examples, the second hearing device 120 does not include an induction coil.

The second hearing device 120 maintains an electromagnetic link 144 with the peripheral device(s) 150 during the induction coil listening mode of operation, and thus may receive commands from the peripheral device 150 in various examples. The received commands are further shared with the first hearing device using an NFMI command link 142, in some examples, as the first hearing device has deactivated the wireless radio 114. In various examples, the first hearing device 110 further provides the second hearing device 120 with periodic updates regarding its status (battery status, listening mode, user control activations, etc.) using the NFMI command link 142. The second hearing device 120 may include this information and provide status updates regarding the first and second hearing devices to the peripheral device 150 using wireless or electromagnetic link 144, in some examples.

According to various examples, for either or both of the first and second hearing devices, the induction coil listening mode may include combining the induction coil input with one or more microphone inputs before outputting the audio signal using a receiver. For example, at least a portion of the audio signal is derived from the signal received by the first induction coil 117 and a second portion of the of the audio signal may be derived from either the first microphone 111, second microphone 121, or both. The first microphone 111 and second microphone 121 may each, respectively, include any number of operatively connected microphones used in an array, e.g., directional microphone array, beamforming array, etc., in various examples. In some examples, the first hearing device 110 mixes audio from the first induction coil 117 with audio from the first microphone 111 while the second hearing device 120 mixes audio from the first induction coil 117 with audio from the second microphone 121. In other examples, the first hearing device 110 mixes audio from the first induction coil 117 with audio from the first microphone 111 while the second hearing device 120 also mixes audio from the first induction coil 117 with audio from the first microphone 111. In some examples, the processor of the first hearing device 110 pre-mixes audio from the first induction coil 117 with audio from the first microphone 111 prior to sending the audio to the second hearing device 120 over the NFMI audio link 140.

The processors of either or both of the first or second hearing devices may process, alter, enhance, or attenuate audio input and output signals at any stage in the processes described herein, in various examples. In some examples, the first and second hearing devices may coordinate a schematic role swap in order to duty cycle the processes described herein in order to efficiently balance and/or conserve battery power resources of one or more of the hearing devices. In some examples, one hearing device of a binaural set may either not contain a telecoil or the second hearing device may have a second telecoil that is oriented for a functional emphasis different than that of the first telecoil of the first hearing device. Therefore, in some examples, it may be useful for the system to store and share information regarding the availability of a telecoil for specific functional emphases within the memory of one or more of the hearing devices, peripheral device, or a server operatively connected to the same. This information regarding the device-specific telecoil availability and orientation may be used to determine if a schematic role swap is appropriate for a given binaural set of hearing devices or a specific functional emphasis, i.e., the user's listening intent being for listening to a hearing loop or a telephone. This provision can be advantageous, in some examples, because it would be undesirable for a schematic role swap to cause an appreciable difference in the sensed inductive signal or audio to occur and become apparent to the user.

In some examples, the first hearing device 110 may either completely deactivate the first Bluetooth radio 114 or reduce the amount of activity of the first Bluetooth radio 114 (e.g., increasing the amount of time between advertisement packets being transmitted) when in an induction coil listening mode to mitigate or eliminate ticking. For example, it may be advantageous to maintain some (albeit reduced) Bluetooth connectivity by the first hearing device 110. In addition, by increasing the intervals between radio activity, secondary tick concealment algorithms may be used and are more effective and yield better sound quality for the received induction coil audio signal. However, slowing the Bluetooth radio advertisement rate may negatively impact the responsiveness of user-initiated changes through a remote control accessory or smartphone. At particularly slow advertisement rates, some control commands may be lost entirely, which could lead to user frustration; thus, it would be advantageous, in various examples, to have at least one hearing device of a binaural set maintain typical wireless Bluetooth radio activity.

FIG. 1 illustrates a system 100 for mitigating interference for a telecoil signal for hearing devices, according to various examples of the present subject matter. The system 100 includes a first hearing device 110 and a second hearing device 120. The first hearing device 110 includes a magnetic sensor such as a first induction coil 117 configured to sense an inductive signal, a first wireless radio 114 configured for wireless communication, and a first near-field radio 116 configured for near-field communication. The second hearing device 120 includes a second wireless radio 124 configured for wireless communication, and a second near-field radio 126 configured for near-field communication. The first hearing device 110 is configured to selectively deactivate the first wireless radio 114 when using the magnetic sensor to reduce interference in the inductive signal, and further configured to transmit the sensed inductive signal 132 to the second hearing device 120 using the first near-field radio 116 using the audio link 140. The second hearing device 120 is configured to receive the sensed inductive signal from the first hearing device 110 using the second near-field radio 126.

In various examples, the second hearing device 120 is configured to maintain a wireless link 144 to a peripheral device 150 using the second wireless radio 124 when the first hearing device 110 has selectively deactivated the first wireless radio 114. The second hearing device 120 is configured to receive commands from the peripheral device 150 using the second wireless radio 124 and forward the received commands to the first hearing device 110 using the second near-field radio 126 via a command link 142, in various examples. This configuration is advantageous, in various examples, because it allows both hearing devices to reliably receive commands from a remote control or smartphone application user interface without interruption, which would not be the case if both hearing devices had reduced or deactivated Bluetooth radio activity. In some examples, the second hearing device 120 is configured to receive status information from the first hearing device 110 using the second near-field radio 126 and forward the received status information to the peripheral device 150 using the second wireless radio 124.

The first hearing device 110 includes a first microphone 111, and is configured to mix audio received from the first microphone 111 with the sensed inductive signal 132, in various examples. In some examples, the first hearing device 110 is configured to transmit the mixed audio to the second hearing device 120 using the first near-field radio 116 over an audio link 140. An NFMI link is shown for audio link 140, but other links may be used without departing from the scope of the present subject matter. The second hearing device 120 includes a second microphone 121 and is configured to mix audio received from the second microphone 121 with the sensed inductive signal 132, in some examples. In various examples, the magnetic sensor includes an induction coil 117 or a telecoil. At least one of the first wireless radio 114 and the second wireless radio 124 includes a Bluetooth® compatible radio, in various examples. According to various examples, at least one of the first hearing device 110 and the second hearing device 120 includes a hearing aid. In some examples, the second hearing device 120 is configured to forward the sensed inductive signal to the peripheral device 150 using the second wireless radio 124. In various examples, a processor of at least one of the first hearing device, the second hearing device, or the peripheral device is configured to perform signal feature analysis on the sensed inductive signal, where the signal feature analysis results in one or more of a signal feature detection, a signal feature statistic, a hearing loop detection, a context detection, and a user activity detection. In some examples, at least one of the first hearing device, the second hearing device, or the peripheral device is configured to store the sensed inductive signal in a memory.

In some examples, the telecoil audio sensed by the first hearing device may be delayed in the first hearing device such that it can be synchronized with the output in the second hearing device. For example, the delay in transmission of the NFMI signal may be calculated, such as by sending and receiving a test signal, and the transmission delay may be used by the first hearing device for delaying output of the telecoil audio. In this way, the first and second hearing devices can coordinate the output of telecoil audio to provide synchronization of audio output.

In some examples, the sensed inductive signal is analyzed as a background process of the hearing devices' typical function, i.e., while the hearing devices are not set to a telecoil listening mode. This processing can be used for automatically detecting the presence of a hearing loop (such as in commonly-owned U.S. patent application Ser. No. 17/754,833 entitled HEARING ASSISTANCE SYSTEM WITH AUTOMATIC HEARING LOOP MEMORY) and determining other information regarding the context or activities of the user (such as in commonly-owned U.S. patent application Ser. No. 18/316,563 entitled USE OF HEARING INSTRUMENT TELECOILS TO DETERMINE CONTEXTUAL INFORMATION, ACTIVITIES, OR MODIFIED MICROPHONE SIGNALS). In some examples, these background processes can be conducted on sensed inductive signals collected while the first wireless radio is still active, i.e., during the hearing devices' typical function, and therefore the sensed inductive signal may be prone to having telecoil tick artifacts. In some examples, upon the detection of a suitable hearing loop signal or other contexts or activities, the system of the present subject matter may, in response to said detection, selectively deactivate the first wireless radio.

In other examples, the sensed inductive signal used for the background analysis are collected from periods when the first wireless radio is selectively deactivated to prevent the telecoil tick artifacts from interfering with the background analysis processes. In some examples, the system may first selectively deactivate the first wireless radio and then collect data or audio from the first magnetic sensor. The collected data or audio may then be stored or transmitted to the second hearing device using the first and second near-field radios. In some examples, the stored data or audio is analyzed by one or more of the processor of the first hearing device, the processor of the second hearing device, the processor of an operatively connected accessory, smartphone, tablet, mesh network device or a cloud computing resource. In some examples, the stored data or audio may be transmitted to one or more of an operatively connected accessory, smartphone, mesh network device, or cloud computing resource by the first wireless radio after the radio has been reactivated. In some examples, the stored data or audio may be transmitted to one or more of an operatively connected accessory, smartphone, mesh network device, or cloud computing resource by the second wireless radio after the data or audio has been received by the second hearing device via the first and second near-field communication radios. In some examples, upon the detection of a suitable hearing loop signal or other contexts or activities based on the stored sensed inductive data or audio, the system of the present subject matter may, in response to said detection, initiate a telecoil listening mode and selectively deactivate the first wireless radio.

In some examples, the processor of the first hearing device or the second hearing device may be used to perform signal feature analysis to detect the presence of a suitable hearing loop signal or other contexts or activities of the user based, at least in part, on the sensed inductive data or audio. In some examples, any suitable combination of processors of the first hearing device, second hearing device, or peripheral device may, instead of or in addition to conducting a signal feature analysis of the sensed inductive signal or data, calculate statistics related to the sensed inductive signal. In some examples, the sharing of statistical data may reduce the wireless data transmission payloads between devices, assist in making more rapid hearing loop, context, and user activity detections, or improve the accuracy of the same. In some examples, the system of the present subject matter may, in response to said detections, initiate a telecoil listening mode and selectively deactivate the first wireless radio.

Previous solutions to reduce ticking for magnetic sensors such as telecoils have been employed, but each has significant limitations. For example, some previous concealment methods detected when a tick occurred, and replayed the previous few milliseconds of the telecoil signal instead of the ticking section of audio. However, while this audio replay eliminates the tick, it often creates a significant acoustic artifact if there is a desired signal occurring and not just random background noise and/or it may diminish the audibility of sounds of listening interest, e.g., speech phonemes, musical notes, and the like. This issue becomes worse as ticking frequency increases, and thus this previous method had to be abandoned in practice with the adoption of certain 2.4 GHz audio streaming protocols, e.g., Android Streaming for Hearing Aids (ASHA), Apple's Low Energy Audio (LEA), and Bluetooth Auracast, due to this issue. Further, tick mitigation using aggressive expansion or cancellation can mistakenly filter out useful audio signals and/or cause undesirable, perceivable noise floor modulations. In another example, some previous methods adjusted wireless communication circuit layout and telecoil position to minimize the tick magnetic field that the telecoil picks up. However, determining effective layout changes for a hearing device is difficult to do with device space constraints and often requires significant durations of engineering and technician trial-and-error. Even at that, it is often impossible to completely eliminate the tick using this method. In yet another example, some previous methods raised the circuit noise floor to mask the ticking component. However, while increasing the noise floor is simple and effective for barely audible ticks, it also increases telecoil equivalent input noise (EIN), thus reducing sound quality and audibility of low-level sounds that would be of interest for the wearer of the hearing device, such as soft, voiceless, fricative speech sounds. Similarly, expansion techniques applied to the audio compressor architecture reduce the audibility of low-level sounds that would be of interest to the user. Electromagnetic shielding can be implemented to help control the radiation of magnetic fields from specific components, but adds additional material cost, size, design complexity and, in some internal hearing device component layouts, may reduce the telecoil's sensitivity to the desired magnetic field.

The present subject matter is unique in that it requires no special physical layout considerations and does not degrade the telecoil signal content. In addition, the present subject matter provides the ability to incorporate telecoil technology into a greater number of hearing device styles, including micro receiver-in-canal devices (RICs) and smaller custom hearing devices. Further benefits of the present subject matter include reducing design effort, time, and cost around telecoils, reducing custom hearing device casing time, reducing the frequency of warranty claims for telecoil tick complaints, and providing better sound quality and lower EIN during telecoil use. The present subject matter is also unique in that it does not compromise the responsiveness of the hearing devices' wireless control and status monitoring functionality.

Figure 2:
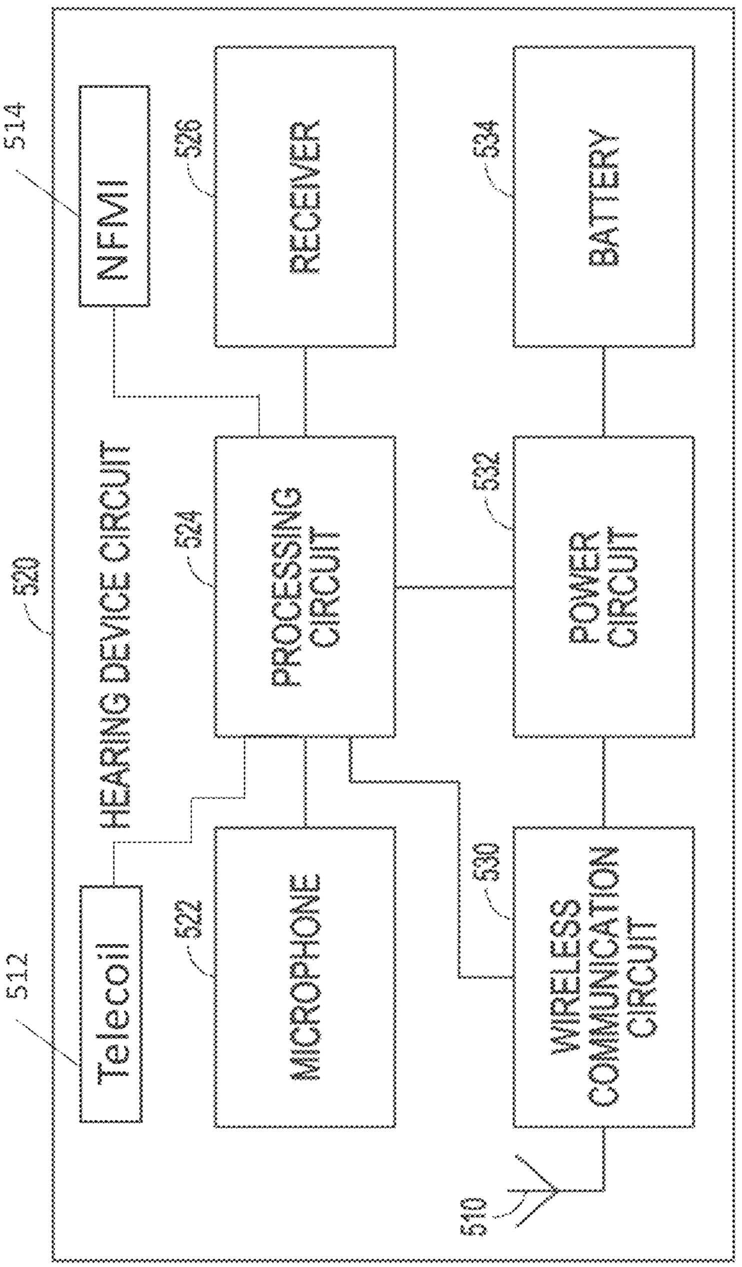
FIG. 2 illustrates a block diagram of a hearing device circuit, according to various examples of the present subject matter.

FIG. 2 illustrates a block diagram of a hearing device circuit, according to various examples of the present subject matter. Hearing device circuit 520 represents an example of portions of a hearing device and includes a microphone 522, a wireless communication circuit 530, an antenna 510, a telecoil 512, an NFMI device 514 (or other near-field radio), a processing circuit 524, a receiver (speaker) 526, a battery 534, and a power circuit 532. Microphone 522 receives sounds from the environment of the hearing device user (wearer of the hearing device). Wireless communication circuit 530 communicates with another device wirelessly using antenna 510, including receiving programming codes, streamed audio signals, and/or other audio signals and transmitting programming codes, audio signals, and/or other signals. Examples of the other device includes other hearing devices of other users, another hearing device of a pair of hearing devices for the same wearer, a hearing device host device, an assistive listening device (ALD), an audio streaming device, a smartphone, and other devices capable of communicating with hearing devices wirelessly. Processing circuit 524 controls the operation of hearing device using the programming codes and processes the sounds received by microphone 522 and/or the audio signals received by wireless communication circuit 530 and telecoil 512 to produce output sounds. Receiver 526 transmits output sounds to an ear canal of the hearing device wearer. Battery 534 and power circuit 532 constitute the power source for the operation of hearing device circuit 520. In one example, power circuit 532 can include a power management circuit. In another alternative or additional example, battery 534 can include a rechargeable battery and power circuit 532 can include a recharging circuit for recharging the rechargeable battery.

In various examples, the hearing device is configured to mitigate interference from a magnetic sensor signal. The hearing device circuit 520 includes a magnetic sensor, such as a telecoil 512, configured to receive an inductive input, and at least one processor or processing circuit 524 and data storage in communication with the processing circuit 524. The data storage comprises instructions thereon that, when executed by the processing circuit 524, causes the processing circuit 524 to perform the functions of the present systems and methods. The hearing device circuit 520 may be included in an ear bud, headphones, a hearing aid, or other ear-wearable device, in various examples.

In still other examples, the hearing device may communicate with a body worn device such as a neck loop with a Bluetooth radio (such as in commonly-owned U.S. Pat. No. 11,197,107 entitled CONFIGURABLE HEARING DEVICE FOR USE WITH AN ASSISTIVE LISTENING SYSTEM) and such a body worn device may include a magnetic field transmitter to convey the audio to a person wearing a hearing aid or hearing aids equipped with a telecoil 512. Various types of wireless connections may be used, including but not limited to Bluetooth® (such as Bluetooth® 5.2, or Auracast, for example) or Bluetooth® Low Energy (BLE) connections, infrared, frequency modulation (FM) radio, digital modulation (DM) radio, and the like.

In various examples, at least one of the hearing devices includes a connection to a smartphone application. The smartphone application is configured to be used to control the hearing devices, in some examples. In some examples, at least one of the hearing devices includes a voice control configured to be used to control the hearing devices. In various examples, at least one of the hearing devices is a hearing assistance device, such as a hearing aid.

Figure 3:
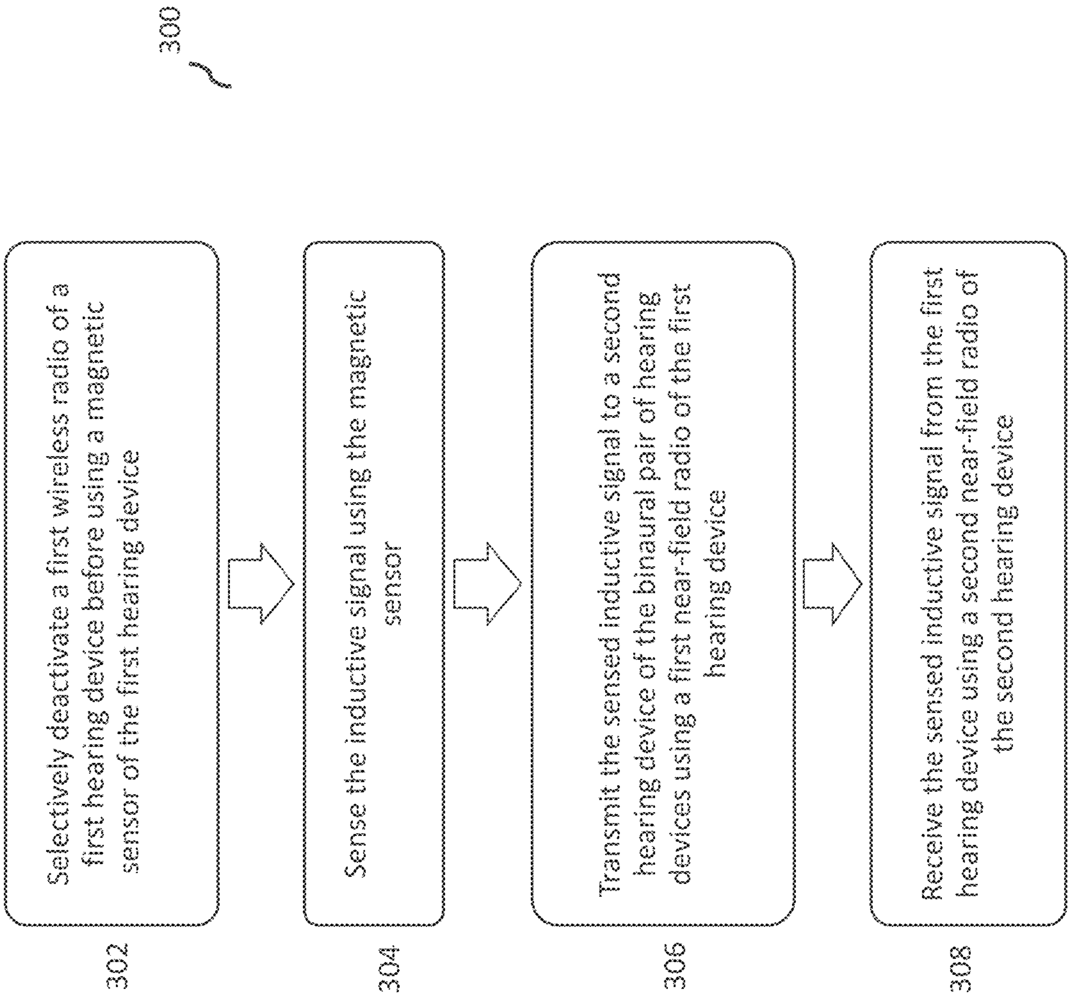
FIG. 3 illustrates a flow diagram of a method for mitigating interference for a telecoil signal for hearing devices, according to various examples of the present subject matter.

FIG. 3 illustrates a flow diagram of a method for mitigating interference for a telecoil signal for hearing devices, according to various examples of the present subject matter. The method 300 includes selectively deactivating a first wireless radio of the first hearing device before using a magnetic sensor of the first hearing device to sense an inductive signal, at step 302. The deactivation may be configured to reduce interference in the sensed inductive signal, in some examples. At step 304, the inductive signal is sensed using the magnetic sensor, and the sensed inductive signal is transmitted to a second hearing device of the binaural pair of hearing devices using a first near-field radio of the first hearing device, at step 306. The method 300 also includes receiving the sensed inductive signal from the first hearing device using a second near-field radio of a second hearing device, at step 308.

In various examples, the method 300 further includes using the second hearing device to maintain a wireless link to a peripheral device using a second wireless radio when the first hearing device has selectively deactivated the first wireless radio. The method 300 may further include using the second hearing device to receive commands from the peripheral device using the second wireless radio and forward the received commands to the first hearing device using the second near-field radio, in some examples. According to various examples, the method 300 further includes using the second hearing device to receive status information from the first hearing device using the second near-field radio and forward the received status information to the peripheral device using the second wireless radio.

The method 300 also may include using the first hearing device to mix audio received from a first microphone of the first hearing device with the sensed inductive signal, in some examples. In various examples, the method 300 also includes using the first hearing device to transmit the mixed audio to the second hearing device using the first near-field radio. The method 300 further includes using the second hearing device to mix audio received from a second microphone of the second hearing device with the sensed inductive signal, in some examples. In various examples, the magnetic sensor includes a telecoil. The first wireless radio is a Bluetooth® compatible radio, in various examples. According to various examples, at least one of the first near-field radio and the second near-field radio includes an NFMI radio.

In various examples, the present system and method provides for role-switching or interchangeability of the first and second devices, such as left and right hearing devices. For example, the system may coordinate role-switching to duty cycle the sensing and processing of signals. In other examples, the system may coordinate role-switching to maintain a strong or reliable Bluetooth connection with a peripheral device. In one example, if the strength of the Bluetooth connection between one of the devices and the peripheral device is sensed to be below a programmable threshold, the present system may prompt the binaural pair of hearing devices to coordinate such that the device with the stronger Bluetooth connection serves that role (connecting or maintaining connection with the peripheral device) and the other device of the pair serves the role of sensing the telecoil signal. In various examples, the system may activate/deactivate the Bluetooth radio and inductive coil of the respective devices to provide for the role-switching.

In some examples, the system may selectively apply independent mathematical weights to each of the first hearing device and second hearing device which influence when role switches occur. For example, some hearing device may be more sensitive to the desired inductive signal than others and therefore produce one or more of a better sound quality, improved signal to noise ratio, lower noise floor, or wider dynamic range. This observation is particularly true among binaural pairs of custom hearing device styles as there are generally greater degrees of freedom for telecoil and internal component placement and orientations. In some examples, a hearing device may be assigned a mathematical weighting bias that causes the system of the present invention to favor a particular hearing device of a binaural set to act as the first hearing device or the second hearing device, respectively. Various hearing device characteristics can be assigned or contribute to weightings that influence when role switches occur, such as: inductive signal strength or quality, wireless radio signal strength, remaining battery level or operational expectancy, recent runtime in a given role (as the acting first hearing device or second hearing device), and the like. Any suitable switching thresholds, weighting values, statistics, and calculation methods thereof may be employed.

Figure 4:
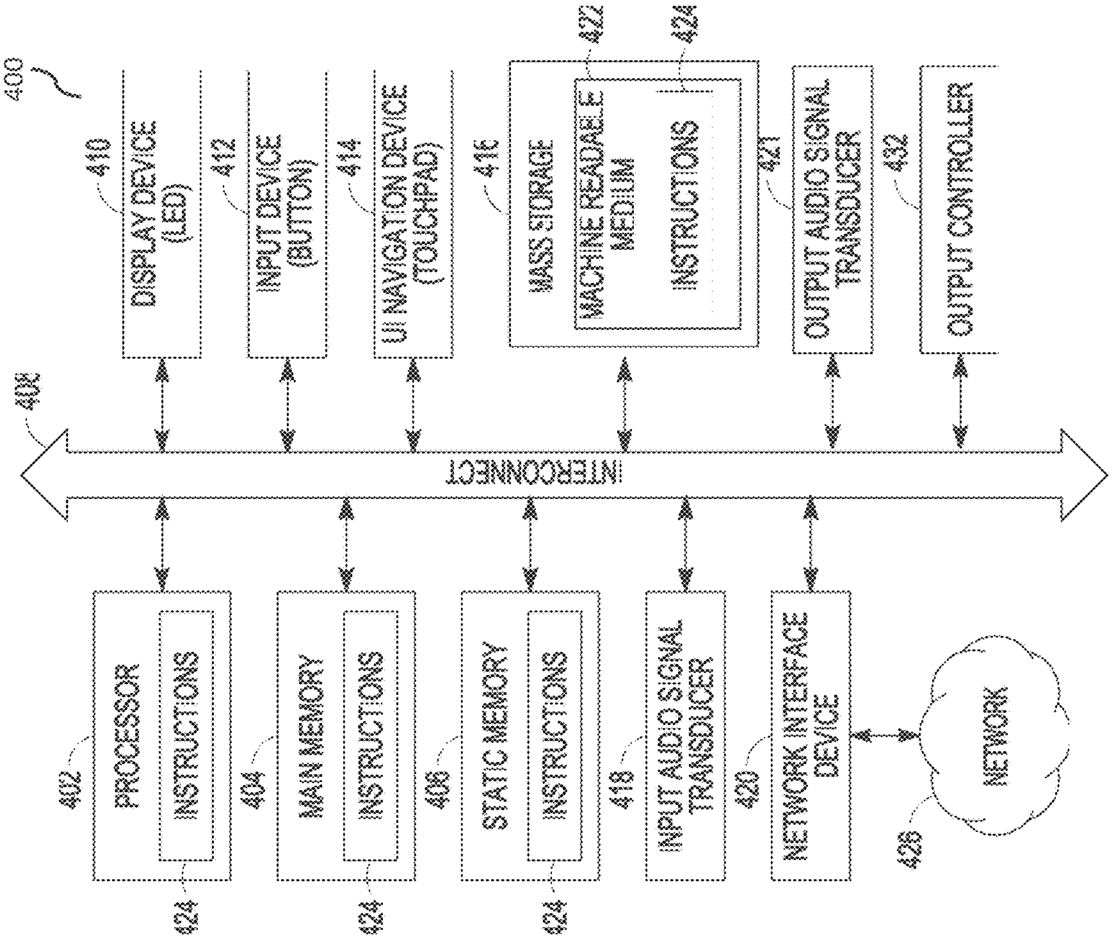
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative examples, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a hearing device, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404, and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412, and UI navigation device 414 may be a touch screen display. The machine 400 may additionally include a storage device (e.g., drive unit) 416, one or more input audio signal transducers 418 (e.g., microphone), a network interface device 420, and one or more output audio signal transducers 421 (e.g., speaker). The machine 400 may include an output controller 432, such as a serial (e.g., universal serial bus (USB), parallel, or other wired or wireless (e.g., infrared (IR), near-field communication, etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: nonvolatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) vi one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various examples of the present subject matter support wireless communications with a hearing device. In various examples the wireless communications may include standard or nonstandard communications. Some examples of standard wireless communications include link protocols including, but not limited to, cellular networks, Wi-Fi®, Bluetooth™, BLE, Auracast, IEEE 802.11 (wireless LANs), 802.15 (WPANs), 802.16 (WiMAX), cellular protocols including, but not limited to CDMA and GSM, ZigBee, and ultra-wideband (UWB) technologies, and any such wireless networks that are or may be used in hearing devices. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various examples, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various examples, the battery is rechargeable. In various examples multiple energy sources are employed. It is understood that in various examples the microphone is optional. It is understood that in various examples the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various examples of the present subject matter the processor is adapted to perform instructions stored in one or more memories, which may or may not be explicitly shown. Various types of memory may be used, including volatile and nonvolatile forms of memory. In various examples, the processor or other processing devices execute instructions to perform a number of signal processing tasks. Such examples may include analog components in communication with the processor to perform signal processing tasks, such as sound reception by a microphone, or playing of sound using a receiver (i.e., in applications where such transducers are used). In various examples of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to RIC or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction or otherwise osseointegrated hearing devices, in some examples. The present subject matter may be used in devices whether such devices are standard or custom fit and whether they provide an open or an occlusive design. It is understood that other hearing devices not expressly stated herein may be used in conjunction with the present subject matter.

Other Notes and Examples

Example 1 is a system including a first hearing device including: a magnetic sensor configured to sense an inductive signal, a first wireless radio configured for wireless communication, and a first near-field radio configured for near-field communication, and a second hearing device including: a second wireless radio configured for wireless communication, and a second near-field radio configured for near-field communication, wherein the first hearing device is configured to selectively deactivate the first wireless radio when using the magnetic sensor to reduce interference in the inductive signal, and further configured to transmit the sensed inductive signal to the second hearing device using the first near-field radio, and wherein the second hearing device is configured to receive the sensed inductive signal from the first hearing device using the second near-field radio.

In Example 2, the subject matter of Example 1 optionally includes wherein the second hearing device is configured to maintain a wireless link to a peripheral device using the second wireless radio when the first hearing device has selectively deactivated the first wireless radio.

In Example 3, the subject matter of Example 2 optionally includes wherein the second hearing device is configured to receive commands from the peripheral device using the second wireless radio and forward the received commands to the first hearing device using the second near-field radio.

In Example 4, the subject matter of Example 2 optionally includes wherein the second hearing device is configured to send and/or receive status information from the first hearing device using the second near-field radio and forward the received status information to the peripheral device using the second wireless radio.

In Example 5, the subject matter of any of the previous Examples optionally includes wherein the first hearing device includes a first microphone, and wherein the first hearing device is configured to mix audio received from the first microphone with the sensed inductive signal.

In Example 6, the subject matter of Example 5 optionally includes wherein the first hearing device is configured to transmit the mixed audio to the second hearing device using the first near-field radio.

In Example 7, the subject matter of any of the previous Examples optionally includes wherein the second hearing device includes a second microphone, and wherein the second hearing device is configured to mix audio received from the second microphone with the sensed inductive signal.

In Example 8, the subject matter of any of the previous Examples optionally includes wherein the magnetic sensor includes a telecoil.

In Example 9, the subject matter of any of the previous Examples optionally includes wherein at least one of the first wireless radio and the second wireless radio includes a Bluetooth® compatible radio.

In Example 10, the subject matter of any of the previous Examples optionally includes wherein at least one of the first hearing device and the second hearing device includes a hearing aid.

In Example 11, the subject matter of Example 2 optionally includes wherein the second hearing device is configured to transmit the sensed inductive signal to the peripheral device using the second wireless radio.

In Example 12, the subject matter of Example 2 optionally includes wherein a processor of at least one of the first hearing device, the second hearing device, or the peripheral device is configured to perform signal feature analysis on the sensed inductive signal, wherein the signal feature analysis results in one or more of a signal feature detection, a signal feature statistic, a hearing loop detection, a context detection, and a user activity detection.

Example 13 is a method including using a first hearing device of a binaural pair of hearing devices to: selectively deactivate a first wireless radio of the first hearing device before using a magnetic sensor of the first hearing device to sense an inductive signal, the deactivation configured to reduce interference in the sensed inductive signal, sense the inductive signal using the magnetic sensor, and transmit the sensed inductive signal to a second hearing device of the binaural pair of hearing devices using a first near-field radio of the first hearing device, and using the second hearing device of the binaural pair of hearing devices to: receive the sensed inductive signal from the first hearing device using a second near-field radio of the second hearing device.

In Example 14, the subject matter of Example 13 optionally further includes using the second hearing device to maintain a wireless link to a peripheral device using a second wireless radio when the first hearing device has selectively deactivated the first wireless radio.

In Example 15, the subject matter of Example 14 optionally further includes using the second hearing device to receive commands from the peripheral device using the second wireless radio and forward the received commands to the first hearing device using the second near-field radio.

In Example 16, the subject matter of Example 14 optionally further includes using the second hearing device to receive status information from the first hearing device using the second near-field radio and forward the received status information to the peripheral device using the second wireless radio.

In Example 17, the subject matter of any of Examples 13-16 optionally further includes using the first hearing device to mix audio received from a first microphone of the first hearing device with the sensed inductive signal.

In Example 18, the subject matter of Example 173 optionally further includes using the first hearing device to transmit the mixed audio to the second hearing device using the first near-field radio.

In Example 19, the subject matter of any of Examples 13-18 optionally further includes using the second hearing device to mix audio received from a second microphone of the second hearing device with the sensed inductive signal.

In Example 20, the subject matter of any of Examples 13-19 optionally includes wherein the magnetic sensor includes a telecoil.

In Example 21, the subject matter of any of Examples 13-20 optionally includes wherein the first wireless radio is a Bluetooth® compatible radio.

In Example 22, the subject matter of any of Examples 13-21 optionally includes wherein at least one of the first near-field radio and the second near-field radio includes a near-field magnetic induction (NFMI) radio.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A system, comprising:

a first hearing device including:

a magnetic sensor configured to sense an inductive signal;

a first wireless radio configured for wireless communication; and a first near-field radio configured for near-field communication; and a second hearing device including:

a second wireless radio configured for wireless communication; and a second near-field radio configured for near-field communication, wherein the first hearing device is configured to selectively deactivate the first wireless radio when using the magnetic sensor to reduce interference in the inductive signal, and further configured to transmit the sensed inductive signal to the second hearing device using the first near-field radio, and wherein the second hearing device is configured to receive the sensed inductive signal from the first hearing device using the second near-field radio.

2. The system of claim 1, wherein the second hearing device is configured to maintain a wireless link to a peripheral device using the second wireless radio when the first hearing device has selectively deactivated the first wireless radio.

3. The system of claim 2, wherein the second hearing device is configured to receive commands from the peripheral device using the second wireless radio and forward the received commands to the first hearing device using the second near-field radio.

4. The system of claim 2, wherein the second hearing device is configured to receive status information from the first hearing device using the second near-field radio and forward the received status information to the peripheral device using the second wireless radio.

5. The system of claim 1, wherein the first hearing device includes a first microphone, and wherein the first hearing device is configured to mix audio received from the first microphone with the sensed inductive signal.

6. The system of claim 5, wherein the first hearing device is configured to transmit the mixed audio to the second hearing device using the first near-field radio.

7. The system of claim 1, wherein the second hearing device includes a second microphone, and wherein the second hearing device is configured to mix audio received from the second microphone with the sensed inductive signal.

8. The system of claim 1, wherein the magnetic sensor includes a telecoil.

9. The system of claim 1, wherein at least one of the first wireless radio and the second wireless radio includes a Bluetooth® compatible radio.

10. The system of claim 1, wherein at least one of the first hearing device and the second hearing device includes a hearing aid.

11. The system of claim 2, wherein the second hearing device is configured to transmit the sensed inductive signal to the peripheral device using the second wireless radio.

12. The system of claim 2, wherein a processor of at least one of the first hearing device, the second hearing device, or the peripheral device is configured to perform signal feature analysis on the sensed inductive signal, wherein the signal feature analysis results in one or more of a signal feature detection, a signal feature statistic, a hearing loop detection, a context detection, and a user activity detection.

13. A method, comprising:

using a first hearing device of a binaural pair of hearing devices to:

selectively deactivate a first wireless radio of the first hearing device before using a magnetic sensor of the first hearing device to sense an inductive signal, the deactivation configured to reduce interference in the sensed inductive signal;

sense the inductive signal using the magnetic sensor; and transmit the sensed inductive signal to a second hearing device of the binaural pair of hearing devices using a first near-field radio of the first hearing device; and using the second hearing device of the binaural pair of hearing devices to:

receive the sensed inductive signal from the first hearing device using a second near-field radio of the second hearing device.

14. The method of claim 13, further comprising:

using the second hearing device to maintain a wireless link to a peripheral device using a second wireless radio when the first hearing device has selectively deactivated the first wireless radio.

15. The method of claim 14, further comprising:

using the second hearing device to receive commands from the peripheral device using the second wireless radio and forward the received commands to the first hearing device using the second near-field radio.

16. The method of claim 14, further comprising:

using the second hearing device to receive status information from the first hearing device using the second near-field radio and forward the received status information to the peripheral device using the second wireless radio.

17. The method of claim 13, further comprising:

using the first hearing device to mix audio received from a first microphone of the first hearing device with the sensed inductive signal.

18. The method of claim 17, further comprising:

using the first hearing device to transmit the mixed audio to the second hearing device using the first near-field radio.

19. The method of claim 13, further comprising:

using the second hearing device to mix audio received from a second microphone of the second hearing device with the sensed inductive signal.

20. The method of claim 13, wherein the magnetic sensor includes a telecoil.

21. The method of claim 13, wherein the first wireless radio is a Bluetooth® compatible radio.

22. The method of claim 13, wherein at least one of the first near-field radio and the second near-field radio includes a near-field magnetic induction (NFMI) radio.

* * * * *